United States Patent [19]

Nakayama et al.

[11] Patent Number: 4,691,416
[45] Date of Patent: Sep. 8, 1987

[54] HOOK DEVICE FOR ORNAMENTAL BUTTON ON SEAT COVER

[75] Inventors: Hiromichi Nakayama; Moritoshi Fukuda, both of Yokohama, Japan

[73] Assignee: Nifco Inc., Yokohama, Japan

[21] Appl. No.: 912,773

[22] Filed: Sep. 26, 1986

[30] Foreign Application Priority Data

Sep. 30, 1985 [JP] Japan .................. 60-148023[U]

[51] Int. Cl.⁴ .............................................. A44B 1/18
[52] U.S. Cl. ................................. 24/90 B; 24/102 SL; 24/241 PS
[58] Field of Search ................... 24/90 B, 90 A, 90.5, 24/97, 102 SL, 102 T, 356, 241 PS, 241 SB

[56] References Cited

U.S. PATENT DOCUMENTS

| | | | |
|---|---|---|---|
| 320,596 | 6/1885 | Smitten | 24/102 SL |
| 484,291 | 10/1892 | Brooks | 24/102 SL |
| 781,171 | 1/1905 | Adler | 24/102 SL |
| 1,025,666 | 5/1912 | Yeagle | 24/241 PS |
| 1,440,628 | 1/1923 | Raub | 24/102 SL |
| 1,873,607 | 8/1932 | Lefevre | 24/90 B |
| 1,907,732 | 5/1933 | Burch | 24/90 B |
| 2,592,725 | 4/1952 | Oram | 24/102 T |
| 4,539,732 | 9/1985 | Wolner | 24/241 SB |

*Primary Examiner*—Victor N. Sakran
*Attorney, Agent, or Firm*—Trexler, Bushnell, Giangiorgi & Blackstone, Ltd.

[57] ABSTRACT

A hook device for an ornamental button on a seat cover comprises a C-shaped main hook to be hooked on a spring rod disposed on the inner side of a cushioning material, an auxiliary hook extending integrally from the end of the main hook in the opposite direction thereto to be hooked on a lock piece of the ornamental button, and a closing piece extending from the end of the main hook toward a free end thereof and having elasticity. The opening of the main hook is closed by the closing piece at all times.

2 Claims, 7 Drawing Figures

HOOK DEVICE FOR ORNAMENTAL BUTTON ON SEAT COVER

FIELD OF THE INVENTION AND RELATED ART STATEMENT

This invention relates to a hook device for an ornamental button on a seat cover and, more particularly, to a hook device for an ornamental button used with a seat, a back support, a bed, etc., which has a spring or springs provided in the inside, a cushioning material or mat of urethane or the like covering the spring in swelled fashion and a cover (cover cloth) enclosing the cushioning material or the mat to enhance the cushioning property, the ornamental button serving to suppress the swelling, thereby enhancing the cushioning property and to improve the ornamental effect.

As is well known in the art, in a seat, bed, etc, where springs or a urethane foam cushioning material of high elasticity is enclosed by a cover, it is the practice to attach ornamental buttons to the cover with the buttons hooked on the inner core, i.e. spring rod, to draw in the cover.

The attachment of the button usually has to be done with the springs or cushioning material in a compressed state, so that the fitting operation is very cumbersome.

Various devices have heretofore been proposed to speed up the button-attaching operation and increase the reliability of the attachment. These devices, however, still have some drawbacks.

Initially, such ornamental buttons were attached using thread or string in the way buttons are attached to a garment. In the case of using string or threads, however, it is cumbersome to tie the required knot. To overcome this drawback, a ring-like hook device has been proposed and put in practical use. This device has a ring formed from a metal rod having a spring force such that its abutting ends can be freely opened and closed. The device is coupled to a lock piece of a button by inserting one of the ends noted above. Then the device is inserted through through-holes formed in the cover and cushioning material. The freely openable and closable ends are brought to the position of a spring rod disposed inside the cushioning material and are urged against the spring rod, whereby the spring rod is hooked in the ring.

This ring-like hook device has an advantage that it can be inexpensively manufactured by merely bending a steel wire into an O-shaped form. On the demerit side, however, it is hard to use, which is a problem when attaching a plurality of buttons.

More specifically, the ring-like hook device is coupled to the button by inserting one end of it through a lock piece of the button, and it is also coupled to the spring rod by inserting one end of it. That is, there is no distinction between the two ends, or there is no particular orientation. Therefore, the end of the hook device to be coupled to the button or spring rod is not fixed, so that it is sometimes orientated such that the opening through which the spring rod is passed is found on the back side so that the device cannot be hooked on the spring rod.

Further, the operation of hooking the hook device is carried out with the cushioning material held in a compressed and repulsive state and in a small space inside the cushioning material. Therefore, it is very cumbersome to perform the operation by confirming the position of the opening each time the hook device is hooked.

OBJECT AND SUMMARY OF THE INVENTION

An object of the invention is to provide a hook device for an ornamental button on a seat cover which can overcome the drawbacks of the prior art ring-like hook device and can be attached in a very ready and highly efficient operation.

In view of the drawbacks of the prior art noted above, the hook device according to the invention is provided with independent means to be hooked on a lock piece of an ornamental button and means to be hooked on a spring rod provided inside a cushioning material. When the hook device is coupled to the button, the means to be hooked on the spring rod automatically projects in the opposite direction toward the spring rod to facilitate the hooking operation. The means to be hooked on the spring rod includes a resilient closing means. The closing means can be readily opened by urging it against the spring rod so that the means is hooked thereon.

More specifically, the hook device according to the invention comprises a C-shaped main hook to be hooked on a spring rod, a C-shaped auxiliary hook to be hooked on a lock piece of an ornamental button, and a resilient closing piece extending from the stem of the main hook toward a free end thereof for closing the opening thereof.

The hook device according to the invention is molded by injection molding using a synthetic resin having adequate elasticity and rigidity, e.g. polyacetal. Preferably, the main and auxiliary hooks are rigid and free from flexing, while the closing piece has a reduced thickness and has flexibility. In this case, the hook device is suited for mass production by molding as a one-piece molding.

To attach the button with this hook device, the hook device is first coupled to the button by inserting the auxiliary hook through a hole of a lock piece provided on the back side of the button so that the hook device depends from the button. Then, the hook device is inserted through holes formed in the cover and cushioning material of a seat or the like. The button is then urged against the cover to compress the cushioning material to allow the main hook to reach a spring rod disposed under the cushioning material. Then the main hook is hooked on the spring rod by urging the closing piece in the closed state against the spring rod and thereby opening the opening of the main hook.

When the button in the urged state is released after the main hook has been hooked on the spring rod in this way, floating of the button is prevented by the spring rod so that the cushioning material is held in the compressed state, thus providing an enhanced supporting force.

As soon as the main hook is hooked on the spring rod, the closing piece restores to initial state to close the opening of the main hook. Now, the hook device will not be detached even if it is displaced relative to the spring rod as may be caused when the button is depressed when a person sits on or moves along the seat.

BRIEF DESCRIPTION OF THE DRAWINGS

The above and other objects and features of the invention will become more apparent from the following detailed description with reference to the accompanying drawings, in which.

DETAILED DESCRIPTION OF THE PREFERRED EMBODIMENT

Figure 1:
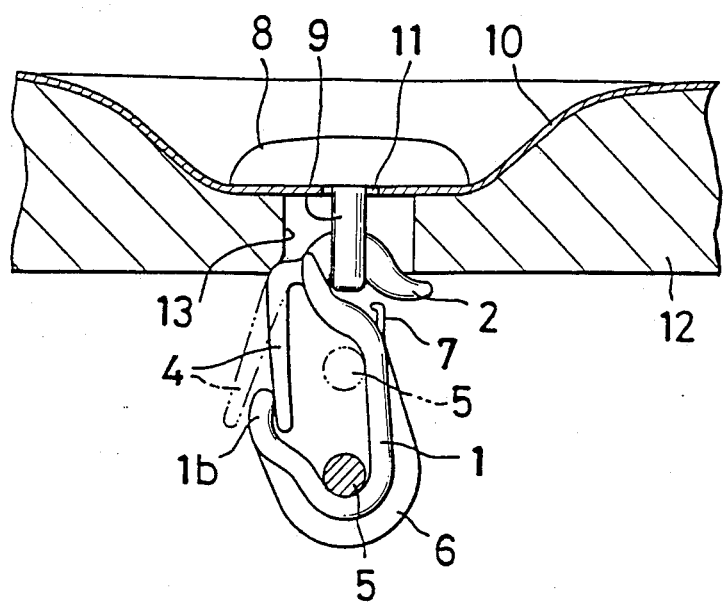
FIG. 1 is an elevational view showing an embodiment of the hook device according to the invention in use.
Figure 2:
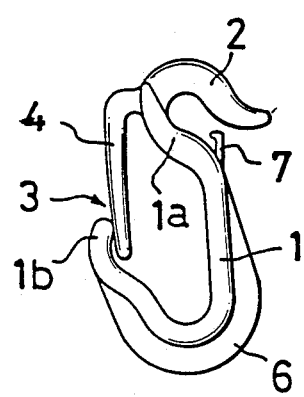
FIG. 2 is an elevational view showing the hook device shown in FIG. 1.

The drawings illustrate an embodiment of the hook device according to the invention. The hook device comprises a C-shaped main hook 1, an auxiliary hook 2, also C-shaped, extending in the opposite direction from an end 1a of the main hook 1, and a closing piece 4 for closing the opening 3 of the main hook 1. In this embodiment, the main and auxiliary hooks 1 and 2 are continuous so as to be substantially S-shaped in form.

As shown in FIG. 1, the main hook 1 is hooked on a spring rod 5 which is disposed inside a seat or the like. A reinforcement rib 6 is provided along the back side of the main hook 1 to prevent elongation of the hook when hooked.

The closing piece 4 for closing the opening 3 of the main hook extends from the base end 1a of the main hook 1 toward the free end 1b thereof. It is adapted to close the opening 3 with its free end in contact with the inner side of the end 1b of the main hook 1. The hook device is molded such that the closing piece 4 projects to the outside as shown by phantom lines in FIG. 1. Afterwards, the free end of the closing piece is forced into the inside of the main hook, thus providing a repulsive force and maintaining the opening 3 of the main hook closed at all times.

Reference numeral 7 in the drawings illustrate a small closing piece which projects from the base end 1a of the main hook 1 toward the free end of the auxiliary hook 2 and has a function similar to that of the closing piece 4.

The hook device having the above construction is molded by injection molding, for instance, using a synthetic resin having adequate elasticity and rigidity, e.g. polyacetal.

In use, the auxiliary hook 2 is first hooked by inserting its free end into a hole of a lock member 9 depending from the back side of a button 8 so that the hook device depends from the button. The hook device in this state is then forcibly inserted through a see-through hole 11 formed in a seat cover 10 and then through a through-hole 13 formed in a cushioning material 12 and communicating with the hole 11 into the inside of the seat. At this time, the button is urged against the surface of the seat cover 10 to push the cushioning material 12 so that the main hook 1 comes to a position facing the spring rod 5 disposed in the inside.

Thereafter, the spring rod 5 is hooked in the main hook 1 through the opening 3 by inwardly urging the closing piece 4. In this way, the attachment of the button is completed.

As has been described in the foregoing, when the main hook 1 is hooked on the spring rod 5, the hook device is held on the inner side of the cushioning material 12. The cushioning material 12 is thus held compressed to an extent corresponding to that to which the button is urged against the seat, so that it provides a repulsive force.

As has been shown, with the construction according to the invention with the auxiliary hook hooked on the lock member of the button such that the hook device depends from the button, the position and the orientation of the opening of the main hook can be specified. In addition, the main hook can be readily hooked on the spring rod on the inner side of the cushioning material by forcibly inserting the main hook through the holes in the seat cover and cushioning material so that it comes to face the spring rod. It is thus possible to obtain a speedy operation of attaching the button. Further, once the main hook is hooked, the closing piece prevents the detachment of the spring rod. Thus the hook device is not readily detached and is reliably held hooked even if the spring rod in the hook is moved following vertical movement of the button caused by a person getting into or out of the seat or displacement of his or her weight along the seat.

The small closing piece 7 for closing the opening of the auxiliary hook is effective for hooking the lock piece of the button. In actual practice, its size and shape may be selected in conformity to the size and shape of the lock piece.

Figure 3:
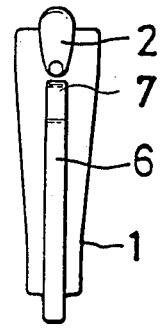
FIG. 3 is a right side view showing the same device.
Figure 4:
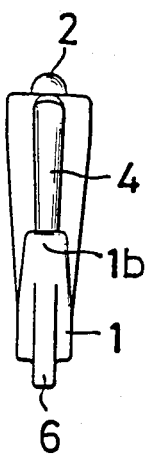
FIG. 4 is a left side view showing the same device.
Figure 5:
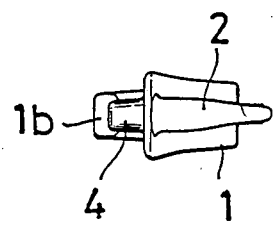
FIG. 5 is a plan view of the same device.
Figure 6:
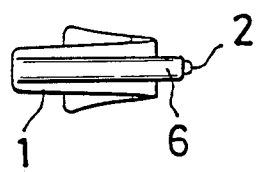
FIG. 6 is a bottom view of the same device.
Figure 7:
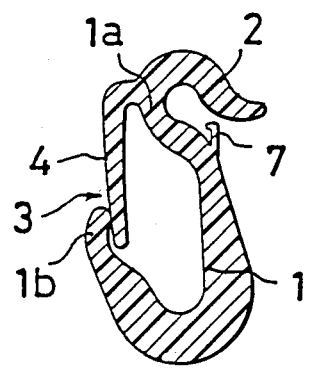
FIG. 7 is a sectional view taken along line VII—VII in FIG. 3.

Further, while in the above embodiment the main and auxiliary hooks are open on opposite sides, it is also possible for the main and auxiliary hooks to open on the same side. In this case, it is advisable to provide the hook device in the shape of FIG. 3 to avoid confusion at the time of the hooking operation.

What is claimed is:

1. A an integral hook device of molded plastic material for hooking an ornamental button on a seat cover, comprising:

a C-shaped main hook to be hooked on a spring rod disposed on the inner side o a cushioning material under the seat cover, said C-shaped main hook being substantially wider than it is thick and having an inner surface that is laterally linear, said C-shaped main hook having an elongated reinforcing rib on the outside thererof and substantially on a central plane thereof, said C-shaped main hook having an end and a free extremity;

a C-shaped auxillarly hook extending integrally from said end of said main hook in the opposite direction to said main hook to be hooked on a lock piece of said ornamental button;

and a closing piece extending from said end of said main hook toward said free extremity end thereof for closing an opening of said main hook.

2. The hook device according to claim 1, which further comprises a small closing piece extending from said end of said main hook toward a free end of said auxiliary hook.

* * * * *